United States Patent Office 3,687,686
Patented Aug. 29, 1972

3,687,686
HIGH PROTEIN READY-TO-EAT BREAKFAST CEREALS CONTAINING SOY CONCENTRATE
William T. Bedenk, Springfield Township, Hamilton County, Ohio, assignor to The Procter & Gamble Company, Cincinnati, Ohio
No Drawing. Filed June 29, 1970, Ser. No. 50,925
Int. Cl. A23l 1/10
U.S. Cl. 99—83                                18 Claims

ABSTRACT OF THE DISCLOSURE

Novel high protein content ready-to-eat cereal products are produced from soya. Soy concentrate having a protein content of 70% up to 90% on a dry basis is partially hydrolyzed in the presence of a proteolytic enzyme and preferably thereafter combined with a cereal grain such as corn, rice, oats, or wheat. The resultant mixture is then processed to produce a cold cereal product having a high nutritive value, i.e. a protein content greater than 20% and that remains crispy and tender after exposure to milk.

BACKGROUND OF THE INVENTION

This invention relates to novel food products of the breakfast cereal class and processes for their production. More specifically, the invention relates to breakfast cereals of the cold or ready-to-eat variety, the two terms used herein synonymously. Such food products produced in accordance with the present invention are tasteful, have excellent eating qualities and are highly nutritious.

Ready-to-eat breakfast cereals traditionally contain as their principal component or basis cereal grains such as corn, rice, oats, wheat or mixtures thereof. Other ingredients are often incorporated into the food product in minor amounts such as salt, sweeteners, flavor additives or enhancers, fats, vitamins, and proteinaceous additives, as well as other additives designed to enhance the product's taste, eating quality and nutritive value. As evidenced in part by the additives commonly blended into the cold cereal product, it has long been the goal of breakfast cereal manufacturers to not only produce a platable product but to produce a product that is capable of contributing significantly to the human body's nutritional needs.

One important requirement of the human body is attainment of the proper protein intake. Prior art cold cereal products have attempted to meet this requirement by including therein such known protein sources as soy flour, wheat gluten, milk protein, or other known protein sources. In particular, the soybean has been recognized as a relatively cheap source of protein and, accordingly, there has been much work in attempting to incorporate it into a cold cereal product. Unfortunately, the soybean possesses a rather unacceptable taste so that its use as a significant protein source in a cold cereal product has been limited because only at relatively low levels of soy content is the characteristic soy taste undectectable in a ready-to-eat cereal product.

Various processes have been developed in an attempt to alleviate the taste problem associated with a soy-containing cereal and have met with limited success. For instance, some of the constituents of the soybean that are organoleptically objectionable can be removed by an alcohol/water extraction process. Sugar coatings and various flavor additives also have been used to mask the rather bitter characteristic soy flavor.

Prior art cold cereal products containing a significant amount of soy also have drawbacks in addition to the aforementioned bitter taste of the soy. Eating quality of a cereal, as reflected by its crispness and tenderness, is also an important consideration. As used herein, crispness refers to the presence of a solid crunchy structure that can be detected while eating the cereal. The lighter and more frangible the structure the more crisp it is. The maximum degree of crispness of a cereal product is detected prior to being contacted with an aqueous liquid. After wetting with the aqueous liquid crispness steadily decreases with time until eventually a soggy and unacceptable product results. Sugar coatings on the individual cereal particles assist somewhat in maintaining the initial crispness of the cereal but sugar itself is soluble in the aqueous liquid, e.g. milk or cream, and therefore has only a temporary effect on the crispness or eating quality of the cereal. By the time the average consumer has gotten to the last portion of a breakfast cereal serving, the cereal has lost its initial crispness to a very noticeable degree. Various edible hydrophobic materials such as animal or vegetable fats or oils have also been used in cereal formulations and as cereal particle coatings in an attempt to lessen the crispness loss but they, too, are not fully satisfactory.

Another aspect of a cereal's eating quality, as above mentioned, is its tenderness. Soy-containing cereals traditionally are not tender. Tenderness, in this context, refers to the ease with which the cereal particle breaks down in the mouth. A cereal particle, in this regard, can be deficient by being hard or by being tough. Generally a cereal becomes more tender when it soaks in an aqueous liquid such as milk. However, high soy protein-containing cereals become tough or leathery when soaked in an aqueous liquid with the result that the cereal product is not tender when eaten and, hence, objectionable to the average consumer.

Still another drawback experienced with the use of soy in a breakfast cereal encountered in "puffed" products is the adverse effect soy exerts on the puffability of a cereal particle. Ready-to-eat breakfast cereals are produced in many forms and shapes such as flakes, puffed cereal pieces, biscuits, granules, shreds and the like. A part of the process of producing the flake and puffed form involves what is referred to as a puffing operation. During puffing, relatively dense flakes and particles are converted into more porous, light and less dense flakes and particles by causing trapped moisture to expand very rapidly from the liquid state to the vapor phase. Soy, however, hinders this change in structure and thereby indirectly affects also the eating quality of the cereal since well-puffed cereals are more crisp and tender than poorly-puffed cereals.

Heretofore, ready-to-eat cereal products containing soy as the protein source, e.g. some containing up to 85% soy flour, have been produced but all have generally met with limited receptivity by the consumer. Poor taste, poor eating qualities and with certain cereal forms, poor puffability have all contributed to the undesirability of soy in a ready-to-eat breakfast food.

It is the object of this invention to produce a high protein, soy-containing cold cereal product which is free from objectionable soy taste, which retains its crispness for a reasonable length of time after exposure to an aqueous liquid, and which is tender.

It is also an object of this invention to provide a novel process of producing a soy-containing cereal having the above referred to attributes by a method which does not have puffing problems where puffing is employed.

These and other bojects will become apparent from the following description of the invention.

SUMMARY OF THE INVENTION

Briefly stated this invention concerns the production of breakfast cereal products which are highly palatable and of pleasing taste and high nutritive value, particularly in their protein contents. More specifically, this invention relates to ready-to-eat breakfast cereal food of acceptable taste and eating quality containing soy protein concentrate, or as more commonly referred to, soy concentrate, in an amount sufficient to give the product a protein content of greater than 20%. Such a product is produced by partially hydrolyzing the soy concentrate in the presence of a proteolytic enzyme, preferably mixing the partially hydrolyzed soy with a gelatinized cereal grain and thereafter processing the mixture to form a cold cereal product. An especially preferred product contains a mixture of the partially hydrolyzed soy concentrate and corn.

In one aspect of the invention a dough is formed by combining a gelatinized cereal grain with soy concentrate that has been partially hydrolyzed. This dough is then extruded, pelletized, flaked and puffed to form a protein fortified cold cereal product.

DESCRIPTION OF THE INVENTION

In the present invention there is produced a protein enriched cold cereal product that is produced in any shape or form desired such as shredded, puffed, crumbled, biscuit, granule, flaked and the like. Proteolytic enzyme treated soy concentrate is used as the major source of protein. In a preferred embodiment a cereal grain selected from the group consisting of corn, oats, rice, wheat and mixtures thereof is admixed with the enzyme treated soy concentrate to form the structural base of the product.

Soy concentrate contains approximately 70% protein on a dry basis so that upon proper admixture with the aforementioned cereal grains the final product will still be classified as a highly nutritional food product, i.e. for breakfast food purposes having a protein content of greater than 20%. Soy concentrate commercially available and the processing of soybean to obtain it forms no part of the present invention.

As used herein, soy concentrate refers to defatted and refined soybean. While soy concentrate presently available on the market contains approximately 70% protein by weight on a dry basis, as used in this invention, soy concentrate can contain anywhere from 70% up to 90% protein on a dry weight basis. Soy concentrate is to be contrasted with soy isolate and soy flour or soy meal. Soy isolate contains from 90% up to 100% protein, while soy flour or soy meal contains 40% up to 70% protein on a dry weight basis. For processes using soy flour and soy isolate in breafast cereals see commonly assigned concurrently filed herewith copending application Ser. No. 50,980. Production of Ready-To-Eat Breakfast Cereals Containing Soy Flour by Alexander L. Liepa and Ser. No. 50,924, High Protein Ready-To-Eat Breakfast Cereals Containing Soy Isolate by William T. Bedenk, respectively. The utilization of soy flour as the protein source in a breakfast cereal product is attractive due to the fact that it results in a very acceptable food product at a relatively cheap price. The advantages of using soy isolate as the protein source is that it allows greater latitude in including cereal grains for their structure and flavor attributes in the formulation while still retaining a high protein content, and contributes less soy flavor and color to the final product than soy flour. Soy concentrate is intermediate the soy flour and soy isolate in that it allows greater incorporation of low protein or non-protein matter in the formulation and contributes less soy flavor than soy flour and is cheaper in price than the soy isolate.

Processes for recovering defatted soy concentrate from soybeans are well known, for example Soybeans and Soybean Products, Interscience Publishers, Inc., Vol. 1, 1950, by Klare S. Markley is one source of information as to the production of soy concentrate.

In accordance with this invention, soy concentrate is made palatable by first subjecting it to a partial hydrolysis. Such an operation has a very pronounced effect on the tenderness and crispness retention of the final product. In the absence of such a treatment a very unacceptable cold cereal results, i.e. the product becomes tough and chewy upon exposure to milk and loses its initial crispness.

The partial hydrolysis of soy concentrate in the present invention is accomplished by mixing the soy concentrate, a proteolytic enzyme and water for a length of time at an elevated temperature. Proteolytic enzymes are instrumental in promoting the hydrolysis of proteins and have been used for such purposes heretofore. Unexpectedly, when soy concentrate is reacted with water in the presence of a proteolytic enzyme and thereafter processed into a cold cereal product the product that results is more tender with less tendency to develop toughness and has greater crinspness retention than does a cold cereal product containing soy that has not been subjected to a partial hydrolysis reaction. The reason for this phenomena is not known and could not be predicted. Surprisingly, the cereal products of the present invention have a better eating quality as a result of the partial protein hydrolysis reaction.

The enzymes used in the present invention cause a hydrolysis of proteins and are to be contrasted with other types of enzymes such as amylolytic, lipolytic, or sucroclastic enzymes. Proteolytic enzymes attack proteins and cause a hydrolysis of the peptide bonds of the polypeptide chains that make up the protein molecule. Unexpectedly, when a protein source is subjected to a partial hydrolysis, i.e. the protein molecule is only partially digested, and thereafter processed into a cold cereal product there results a product having superior crispness and tenderness retention properties.

A degree of hydrolysis of the soy concentrate in excess of that experienced under the conditions set out hereinafter results in a product having an unacceptable taste. No hydrolysis of the soy concentrate or only a partial hydrolysis less than that achieved by following the reaction conditions of this invention gives an unacceptable tasting product as well as a poorly processable ingredient. Only when the soy concentrate is partially hydrolyzed to the degree as taught herein and further processed to an end product is there obtained an acceptable soy-containing high protein ready-to-eat breakfast cereal.

The degree of hydrolysis of the protein source is basically a function of the amount of water present, temperature, time, enzyme level, the particular enzyme used and the presence of any interfering material.

The proteolytic enzymes useful in the present invention are selected from any of several known proteolytic enzymes or mixtures thereof extracted from animal, plant, fungal, or microbial sources. A primary consideration in the enzyme or enzyme mixture used is that it must not contribute a significantly objectionable flavor or odor to the final product. Some examples of proteolytic enzymes found effective in the soy concentrate partial hydrolysis step are papain, pepsin, bromelin, ficin, alcalase, maxitase, thermoase, pronase and mixtures thereof.

The preferred amount of enzymes added to the reaction mixture is 25 p.p.m. to 2500 p.p.m. by dry weight of the soy concentrate. Greater amounts can be used but exert no measurable beneficial influence on the speed of the hydrolysis reaction. Lesser amounts can also be used but as a practical matter are not because of the length of time it would take for the reaction to proceed to the desired end point. The most preferred range is 100 p.p.m. to 600 p.p.m. by dry weight of the soy concentrate.

The reaction vessel used for the partial hydrolysis reaction is not important in that the reaction can be completed in either a batch type or continuous type operation. If a batch process is used it is preferable to first charge the water to the container and thereafter slowly add a mixture of solid soy concentrate and enzyme. The addition of water to the solids can be done but creates problems in that the solids set up into hard lumps initially and requires additional work to break them apart for further processing. The amount of water needed for the partial hydrolysis reaction is basically determined by apparatus limitations. That is, the lower limit of water is determined by the capability of the mixing equipment. The lower the level of water the more viscous will be the resultant mixture. On the other hand, an excessive amount of water in the partial hydrolysis reaction would necessitate additional work in reducing the water level in subsequent processing steps. The preferred level of water is 50% to 80% based on the total weight of the mixture. The most preferred level is 55% to 60% based on the total weight of the mixture.

The temperature maintained during the reaction is not critical provided the temperature is not so high as to "kill" the enzyme activity. That is, for proteolytic enzymes, temperatures in excess of 180° F. have the effect of destroying the activity of that enzyme. A temperature range of 80° F. to 160° F. is suitable for the hydrolysis reaction with the reaction proceeding faster at the higher temperatures. The most preferred temperature range is 120° F. to 130° F.

The time for the reaction to be completed depends on the particular temperature, water level, and enzyme level used. In general 1 min. to 120 min. are sufficient to allow the reaction to come to a completion. Times in excess of 120 min. at a reaction temperature should be avoided to prevent more hydrolysis of the soy concentrate than is desired. Most preferably 1 min. to 5 min. allows for a degree of hydrolysis sufficient to make an acceptable product.

Upon completion of the partial hydrolysis reaction it is preferred to add a partially dried cooked gelatinized cereal grain to the treated soy concentrate, thereby forming a dough. This dough can then be further processed in much the same way as other cereal doughs. Preferably though, the dough is processed as hereinafter discussed. In the event the protein reaction mixture cannot be processed immediately after makeup it can be stored indefinitely provided certain precautions are taken. The proteolytic enzymes of the present invention have a "catalytic" effect at temperatures between 70° F. and 180° F. under stated hydrolysis conditions and, accordingly, would not be expected to further catalyze the hydrolysis reaction at temperatures below 70° F. However, commercially available enzymes frequently are mixtures of enzymes with some of the enzymes being active at lower temperatures. Thus, it is necessary to store the partial hydrolysis reaction mixture at a temperature below 70° F. and preferably below 40° F. if it is not to be used immediately. Storage of the mixture below 40° F. is preferred since this temperature obviates microbiological spoilage. Another method of inactivating the enzyme would be to raise the temperature of the reaction mixture to about 180° F. In the absence of such precautions an over-hydrolyzed protein is possible.

An all-soy concentrate cold cereal product is feasible in accord with the present discovery, and soy concentrate once treated with the proteolytic enzyme and water is processed into a final product in much the same way as known cereal products are made from corn, wheat, oats, or rice. Preferably, however, the partically hydrolyzed soy concentrate is mixed with a cereal grain and then processed into a final form acceptable to the consumer. While the description to follow will describe the production of the preferred products of the present invention, it is to be understood that an all-soy product is produced by the same process and, unless indicated otherwise, under the same process conditions.

According to a preferred aspect of the present invention, soy concentrate is admixed with a cereal grain which has been previously gelatinized. Cereal grains selected from the group consisting of corn, rice, oats, wheat and mixtures thereof when made into a cold cereal possess a rather bland but pleasant taste. Because of the fact the partially hydrolyzed soy concentrate contains a relatively high protein content, the cereal grains commonly included in ready-to-eat cereals are mixed with the soy concentrate in proportions such that the total mixture not only contains greater than 20% protein but also the cutomary taste associated with corn, rice oats, and/or wheat is not masked over nor destroyed by the soy concentrate.

Corn, rice, oats, and wheat all contain relatively low, but significant, protein contents that must be accounted for when determining the total protein content of a soy concentrate-cereal grain mixture. The approximate protein contents of corn, rice, oats, and wheat are 9%, 7%, 14%, and 12%, respectively. The exact protein content of a cereal grain and of a soy concentrate are determined by known routine methods.

The relative proportion of cereal grain flour to soy concentrate that is combined to produce the desired end product is likewise determined easily. In accord with this invention soy concentrate alone or a sufficient amount of soy concentrate blended with a cereal grain is processed to produce a final product containing a total protein content of at least 20%. Most preferably, the "base cereal particle," i.e. the cereal particle consisting of soy concentrate and cereal grain without any additives, contains on a dry weight basis the following: 14% to 34% soy concentrate to 86% to 66% corn; 8% to 29% soy concentrate to 92% to 71% oats; 16% to 37% soy concentrate to 84% to 63% rice; and 10% to 31% soy concentrate to 90% to 69% wheat. Breakfast cereal products containing mixtures of the above cereal grain and soy concentrate are also readily formulated to contain the desired total protein content.

In accord with the preferred process, the additive cereal grain is separately cooked or gelatinized and then blended with the partially hydrolyzed protein source to form a dough.

The cooking or gelatinizing of the cereal additive is performed under conditions similar to those commonly used in the industry. Thus, either a batch cooking or continuous cooking operation is used.. Different methods of cooking include heating at atmospheric pressure in an agitated kettle, heating at elevated pressure in a tumbling type mixer and heating under high pressure in a continuous mixer-extruder.

The amount of water and temperature needed to gelatinize the grains depends upon the particular grain and the particular method used. The preferred method of gelatinizing the cereal grain is by cooking in an extruder under pressure. Such a process is continuous and can be accomplished with greater ease. Additionally, the use of higher pressures attainable in the extruder allow the use of higher temperatures and also lower water levels than possible with a batch type cooking operation. The use of lower water levels thus minimizes the amount of drying required in subsequent steps. Using an extrusion type process at 100 p.s.i.g. to 200 p.s.i.g. pressure and temperatures in the range of 250° F. to 350° F., 12% to 25% water based on the total mixture is sufficient to gelatinize the cereal grain.

The gelatinized cereal grain can, at this point, be added to the previously partially hydrolyzed soy concentrate and further processed to produce the cold cereal product. Preferably, though, the water content of the gelatinized cereal grain is reduced prior to mixing with the partially hydrolyzed protein source. This additional operation is preferred at this point in the process so that subsequent handling and processing operations can proceed more smoothly. Excessive moisture levels in the mixture cause subsequently formed individual cereal forms or shapes to lack body or be overly soft and difficult to handle. The amount of moisture present in the cooked cereal grain at the time of addition to the partially hydrolyzed soy concentrate mixture must be relatively low because water still present from the partial hydrolysis of soy concentrate will contribute significantly to the total moisture content of the mixture. It is preferred that 15% to 30% water be present in the soy concentrate-cooked grain mixture when the product is being made by the preferred method, hereinafter described. Accordingly, to reach the lower water levels often desired, less than 5% water must be present in the cooked cereal grain prior to mixing with the partially hydrolyzed soy concentrate mixture. If the cereal is gelatinized by the continuous extrusion method under pressure, as in the preferred cooking method, the resultant extrudant may flash dry and thereafter contain less than 5% water and as such would not need the additional drying operation.

Depending on the cooking process used, it may be necessary to first break any lumps of cooked cereal formed during the cooking process so that proper drying, if needed, can be performed. Some cereals, in particular corn, have a tendency to agglomerate during the cooking stage and as a result the agglomerates or lumps are more difficult to dry thoroughly. A conventional lump breaker is satisfactory for transforming the lumps into a form more suitable for drying. If, of course, no lumps or agglomerates are formed or drying is not needed, this operation can be eliminated. Various types of equipment are available for the lump-breaking operation and can be used with equivalent results.

When the cooked cereal contains less than 5% moisture it is combined with the previously partially hydrolyzed soy concentrate and is then further processed. In the event the mixture is not to be processed immediately after made, it is stored at about 40° F. if it is to be used within one day or at 0° F. if it is to be used at some time more than a day away. The low temperature storage effectively retards any further enzyme catalyzed reaction and thus prevents additional hydrolysis of the soy concentrate.

In the production of a cold breakfast cereal containing the partially hydrolyzed soy concentrate or the partially hydrolyzed soy concentrate and gelatinized cereal grain various general procedures used for making such food products are utilized depending on the desired form, type, or condition of the final product. Typically a cereal dough is extruded into strands of a relatively small cross sectional area and thereafter sliced into small lengths thereby forming small pellet-like particles. These pellet-like particles are partially dried, if necessary, and formed into flakes. The flakes are then subjected to a puffing operation to transform them into less dense, more porous, and tender flakes. Toasting and/or a coating operation may be employed to enhance the color and/or flavor of the resultant protein fortified cereal product. Alternatively, instead of producing a flake-like product, the flaking step can be omitted with a puffed pellet-shaped product being the result.

As previously mentioned, after the partially hydrolyzed soy concentrate and cooked cereal grain have been mixed the resultant dough is processed by any of several known methods of producing a ready-to-eat cereal product. In the preferred method of transforming the cereal dough into the finished product, the next step is to extrude the dough into strands. An extruder has the effect of mixing the ingredients even more intimately and of forming the dough into a shape easier to handle and more adaptable for existing equipment. Relatively low pressures in the extruder are sufficient for this operation. Pressures within the range of 500 p.s.i.g. to 1000 p.s.i.g. are preferred. Lower pressures can be used but should preferably be avoided since less of a mixing action in the extruder resulting from the low compressive forces associated with low pressures. Pressures high than 1000 p.s.i.g. exert little extra benefits and for this reason are avoided. Temperatures employed in the extrusion process are not a critical feature but do have some effect on the handling characteristics of the extrudant, such as stickiness and body. Temperatures falling within the range of 140° F. to 200° F. have been found to be satisfactory.

The shape of the strands that issue from the extruder is determined by the particular extruder die used in the outlet of the extruder and these strands, in turn, greatly influence the shape of the individual particles of the final product. For instance, if the shape of the strand is circular in its cross-sectional area the ready-to-eat cereal made from this strand will have a different shape or configuration than will a cereal product made from strands that are square, triangular, or any other shape in its cross-sectional area. The particular die used in the extruder is a matter of choice dictated primarily by the shape desired for the final product.

The strands that are extruded from the extruder are next sliced to form pellet-like particles. The choice of the cross-sectional size of the strand issuing from the die and length of cut depends on the size requirement of the final individual piece of cereal. Such parameters are easily determined.

After pelletizing the pellet-like particles are tempered, if necessary, and run through flaking rolls. Depending on the formulation and process conditions used throughout the process it may be necessary to allow the strands and freshly cut pellets to cool down and/or dry somewhat. This tempering has the effect of reducing the tackiness oftentimes associated with partially processed cereal dough. A hold time of up to 30 minutes is sufficient to temper the strands while a hold time of up to two minutes is sufficient for the freshly cut pellets. With some formulations there may be no sticking problem in which case the strands and/or pellets can pass directly to the next operation without any tempering step.

If a flake-type cereal product is desired, the next step after pelletizing is to mechanically modify the pellets to a flake form. This can be accomplished by passing the pellets between a pair of cooperating rollers or a roller and a flat surface spaced apart a distance sufficient to produce the desired flake thickness. In accord with this invention it has been found that a flake thickness of 7 to 12 mils is sufficient to produce a satisfactory product. As the flakes leaves the rolls they are in a dense and relatively hard conditions. Such a flake is unacceptable to the average consumer and, accordingly, an additional processing step must be performed to produce a lighter and more porous flake structure.

Breakfast cereals obtain the desired flake structure by a process known as puffing. Puffing of the flake is also quite important in that it enhances the flake's crispness and tenderness. Cereal flakes containing untreated soy protein are difficult to puff but, unexpectedly, soy protein when partially hydrolyzed in the manner heretofore described does not act as a hindrance on puffing but rather actually improves puffability. This factor is of importance in that the more porous type flakes have a tendency to be more tender than the less porous or less puffed flake. Additionally, soy flavor is diminished even more in the better puffed of two soy-containing flakes. Basically a cereal is puffed by causing trapped moisture in the flake to expand very rapidly from the liquid state to the vapor phase. Rapid heating or a rapid decrease in the pressure are the methods commonly used to convert dense hard flakes into the more palatable porous tender flake. Both methods are well known and are commonly used throughout the industry. Gun puffing is an example of the principle of a rapid decrease in pressure. In this process the cereal flakes are first heated under high pressure and then the pressure is rapidly released to achieve the puffing effect. The process disclosed in U.S. Pat. No. 3,253,533 is an example of a rapid heating puffing method.

To achieve the optimum puffing, care must be taken in controlling the initial moisture content of the unpuffed flake. The specific moisture content that is best depends on the particular puffing process utilized and the particular grain in admixture with the soy concentrate. For instance, for a blend of soy concentrate and cooked gelatinized corn a moisture content of 12% to 14% is optimum for gun puffing while 10–12% moisture content is best for puffing by a process that rapidly heats the flake. The optimum moisture content for any one particular flake composition and puffing technique is best determined on an individual basis.

Additional processing steps are utilized if it is so desired. For instance a toasting operation is used after the puffing step if it is desired to change the color of the flake to a more desired rich golden brown. Frequently, a slight toasting step also brings out a pleasant toasted flavor note.

The flakes can also include various materials to improve taste, appearance and/or functional properties. For instance sugar, salt, flavoring, coloring and/or spices can be used in the formulation either in the original dough or as a coating on the puffed flake. Vitamins and minerals can also be included in the formulation to increase the nutritional value of the breakfast food.

Additives such as fatty acids having a carbon chain length of 12 to 24 or salts of the acid can be included in the formulation as a processing aid. Cooked cereal grains have a tendency to be tacky and thereby cause sticking problems with regard to subsequent processing steps using the cooked grain. Cereal particles also have a tendency to agglomerate together during the cooking process thereby necessitating additional processing. The incorporation of 0.1% to 2% of the aforementioned fatty acid salt into the uncooked cereal grain on a dry weight basis reduces the agglomerating problem as well as the sticking or clogging up of processing equipment.

The above preferred process has been described in regard to producing a product having a flake-type structure. However, if a puffed sphere-type product is desired the above described preferred process only has to be modified slightly. After the formation of pellet-type particles and the tempering period, if any is required, the cereal particles are sent directly to the puffing operation, by-passing the flaking roll or rolls. Thus, the only modification in the process described for producing a flake product is the omission of passing the pellet-like particles through the flaking step.

While rice, oats and wheat make a satisfactory product when blended with the partially hydrolyzed soy concentrate and processed in accordance with this invention, corn is the preferred cereal grain. A cereal dough of corn in admixture with a partially hydrolyzed soy concentrate forms an especially tasteful and pleasing flake structure when formed into the final cold cereal product.

The following examples are given for the purpose of illustrating the production of the novel cold cereal products. Unless otherwise indicated all percentages given are on a weight basis.

EXAMPLE 1

| Formulation | Grams |
| --- | --- |
| Soy concentrate | 100 |
| Bromelin [1] | 0.05 |
| Brewer's grits | 300 |
| Sucrose | 30 |
| Salt | 10 |

[1] 500 p.p.m. of soy concentrate.

Brewer's grits (corn), sucrose, and salt are blended with 230 grams water to make a mixture having 40% water. This mixture is added to a rotary cooker and cooked for 1 hour at 250° F. under a pressure of 18 p.s.i.g. At the end of this time the corn is thoroughly gelatinized. The mixture is then placed in a forced air dryer for 16 hours at 160° F. after having been passed through a hammermill to break up any lumps. The moisture content at this point is 2.5%. 125 grams of water and the proteolytic enzyme, bromelin are blended in a vessel until the bromelin is dissolved. Soy concentrate having a protein content of 75% is then added slowly to the water-bromelin mixture to form a mixture having a total water content of 56%. A 180° F. water jacket is maintained around the vessel so that after completion of the soy concentrate addition the mixture temperature is 125° F. This mixture is held at 125° F. for approximately 3 minutes. The partially dried cooked corn mixture is then blended with the soy concentrate mixture and extruded through an extruder under approximately 500 p.s.i.g. and having a die temperature of 200° F. The mixture is extruded into strands having a circular cross section of approximately 3/16 inch. These strands are then sliced into pellets of approximately 3/16 inch length. These pellets are next passed between a 2-roll mill to produce a flake having a thickness of 0.010 inch. The flakes are then placed in a rotary drier having an outlet temperature of 200° F. and a hold time of 4 minutes. The flakes after this operation have a moisture content of 10%–12%. A jet zone hot air oven operated at 310° F. and with a hold time of 3 minutes puffs the flakes. The resultant flakes having a protein content of 23% are more crisp and more tender after exposure to milk and have a more pleasant taste than flakes made by the same process and same formulation with the exception of no bromelin addition. The flakes made by this example also are easier to puff than are the control flakes.

EXAMPLE II

| Formulation | Grams |
| --- | --- |
| Soy concentrate | 500 |
| Papain [1] | 0.06 |
| Brewer's grits | 1000 |
| Sucrose | 100 |
| Salt | 30 |

[1] 120 p.p.m. of soy concentrate.

The brewer's grits (corn), salt and sucrose are blended with 270 grams of water to form a mixture having 19% water. This mixture is then fed into an extruder. The mixture is gelatinized in the extruder under a pressure of approximately 190 p.s.i.g. and 275° F. Flash drying of the extrudant results in gelatinized corn having a moisture content of 1.5%. The soy concentrate having a protein content of 70% is added to a mixture of the papain, a proteolytic enzyme dissolved in 700 grams of water. This soy concentrate mixture of 58% water is heated to 120° F. and held there for approximately 5 minutes. The cooked corn and treated soy concentrate mixture are then blended to form a dough and fed into an extruder. This mixture while being subjected to a pressure of 600 p.s.i.g. and a temperature of 180° F. is extruded into strands having a circular cross section of about 3/16 inch. After a temper time at room temperature for 20 minutes the strands are sliced into pellets of about 3/16 inch length. These pellets are then passed through a 2-roll mill to produce flakes of about 0.010 inch thickness. These flakes are next dried to a moisture content of 10% and thereafter puffed in a rapid heating puffer operation. That is, the partially dried flakes are contacted with hot salt at 350° F. for 10 seconds to puff the flakes. A control flake having the same formulation with the exception of no papain is made by the same process as above. Upon exposure to milk the flakes made by this example are significantly more tender and have a better taste than the control flakes. In addition, the flakes of this example when puffed produce a more porous and less dense flake than the control flakes. The flakes made in accord with this example have a protein content of about 27%.

When ficin, bromelin, alcalase, maxitase, thermoase, pronase and pepsin are substituted for papain in Example II above at the same level, substantially the same results are obtained.

EXAMPLE III

A puffed spherical shaped product is produced having the same formulation as in Example II. The processing of the ingredients is the same as in Example II up to the point of flaking the pellets. At this point in the operation the pellets are partially dried to a moisture content of 12%. These pellets are then puffed by being contacted for 5 seconds with salt having a temperature of 350° F.

The resultant spherical-shaped product is less dense and has a better taste than a product made by the same process but with no proteolytic enzyme treatment.

Soy concentrate partially hydrolyzed by the process described in Example II and further processed to a final ready-to-eat breakfast cereal by the same cold cereal making process with the exception of no cereal grain addition results in an acceptable product. A cold cereal product made by the same process but with no partial hydrolysis step is more tough, less porous, and has a less desirable taste than the partially hydrolyzed soy concentrate-containing cereal product.

What is claimed is:

1. A highly nutritious and palatable ready-to-eat breakfast cereal wherein the protein content is at least 20%, said cereal containing soy concentrate which has been partially hydrolyzed by a proteolytic enzyme, the amount of said enzyme and the time of said hydrolysis being sufficient to provide improved tenderness and crispness retention in the final cereal product.

2. The ready-to-eat breakfast cereal of claim 1 wherein the soy concentrate has been partially hydrolyzed by reacting it with water in the presence of a proteolytic enzyme at 80° F. to 100° F. for 1 minute to 120 minutes.

3. The ready-to-eat breakfast cereal of claim 2 further containing a cooked cereal grain selected from the group consisting of corn, oats, wheat, rice, and mixture thereof.

4. The ready-to-eat breakfast cereal of claim 3 wherein the cooked cereal grain is corn.

5. The process for making a palatable ready-to-eat breakfast cereal having a protein content of at least 20%, comprising:
 (a) reacting soy concentrate with water in the presence of proteolytic enzyme at 80° F. to 160° F. thereby causing a partial hydrolysis of the soy concentrate the amount of said enzyme and the time of said hydrolysis being sufficient to provide improved tenderness and crispness retention in the final cereal product;
 (b) extruding the partially hydrolyzed soy concentrate into strands of a desired shape;
 (c) slicing the strands into pellet-like particles; and
 (d) puffing the pellet-like particles to form the ready-to eat breakfast cereal.

6. The process of claim 5 wherein the soy concentrate is reacted with the water for 1 min. to 120 min.

7. The process of claim 6 wherein the proteolytic enzyme is present in an amount ranging from 25 p.p.m. to 2500 p.p.m. by weight of the soy concentrate.

8. The process of claim 7 further comprising flaking the pellet-like particles prior to puffing.

9. The process of claim 5 further comprising blending a gelatinized cereal grain with the partially hydrolyzed soy concentrate prior to the extruding step.

10. The process of claim 9 wherein the soy concentrate is reacted with water for 1 min. to 120 min.

11. The process of claim 10 wherein the proteolytic enzyme is present in an amount ranging from 25 p.p.m. to 2500 p.p.m. by weight of the soy concentrate.

12. The process of claim 11 wherein the proteolytic enzyme is selected from the group consisting of papain, pepsin, bromelin, ficin, alcalase, maxitase, thermoase, pronase, and mixtures thereof.

13. The process of claim 12 wherein the proteolytic enzyme is papain.

14. The process of claim 11 wherein the gelatinized cereal grain is selected from the group consisting of corn, oats, wheat, rice, and mixtures thereof.

15. The process of claim 14 wherein the gelatinized cereal grain is corn.

16. The process of claim 15 further comprising flaking the pellet-like particles prior to puffing.

17. The process of claim 5 wherein the proteolytic enzyme is present in an amount ranging from 100 p.p.m. to 600 p.p.m. by weight of the soy concentrate.

18. The process of claim 17 wherein the soy concentrate is reacted with the water at 120° F. to 130° F. for 1 min. to 5 min.

References Cited

UNITED STATES PATENTS

| | | | |
|---|---|---|---|
| 2,436,519 | 2/1948 | Luke | 99—83 |
| 2,478,438 | 8/1949 | Thompson et al. | 99—82 |
| 2,853,388 | 9/1958 | Kiely et al. | 99—83 |
| 3,585,047 | 6/1971 | Fujimaki et al. | 99—98 |
| 2,881,076 | 4/1959 | Sair | 99—14 |

RAYMOND N. JONES, Primary Examiner

U.S. Cl. X.R.

99—17